US012076797B2

(12) United States Patent
Piller et al.

(10) Patent No.: US 12,076,797 B2
(45) Date of Patent: Sep. 3, 2024

(54) HOLE SAW WITH LARGE CARBIDE OVERHANG

(71) Applicant: Milwaukee Electric Tool Corporation, Brookfield, WI (US)

(72) Inventors: Geoffrey R. Piller, Grafton, WI (US); Austin J. Kazda, Wauwatosa, WI (US); Christopher J. Rechlin, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 332 days.

(21) Appl. No.: 17/102,785

(22) Filed: Nov. 24, 2020

(65) Prior Publication Data
US 2021/0146455 A1  May 20, 2021

Related U.S. Application Data

(63) Continuation of application No. PCT/US2020/060174, filed on Nov. 12, 2020.
(Continued)

(51) Int. Cl.
*B23B 51/04* (2006.01)

(52) U.S. Cl.
CPC .......... *B23B 51/04* (2013.01); *B23B 51/0467* (2022.01); *Y10T 408/895* (2015.01)

(58) Field of Classification Search
CPC . B23B 51/04; B23B 2251/14; B23B 2251/28; B23B 51/0466; B27B 5/12;
(Continued)

(56) References Cited

U.S. PATENT DOCUMENTS 1,281,627 A * 10/1918 Misener et al. .... B23B 51/0426
                                                          408/206
3,430,526 A *  3/1969 Valenziano ............ B23B 51/04
                                                          125/20
(Continued)

FOREIGN PATENT DOCUMENTS

CN        2889575        4/2007
CN      107378075       11/2017
(Continued)

OTHER PUBLICATIONS

International Search Report and Written Opinion for International Application No. PCT/US2020/060174, dated Mar. 9, 2021, 13 pages.

*Primary Examiner* — Sunil K Singh
*Assistant Examiner* — Michael Vitale
(74) *Attorney, Agent, or Firm* — Reinhart Boernet Van Deuren s.c.

(57) ABSTRACT

A hole saw with various teeth sets and/or sizes that overhang a sidewall is provided. In some embodiments, a large tooth overhangs an inner diameter of the sidewall to create a larger kerf than the sidewall's thickness. Similarly, a tooth set or variations in the circumferential directions of the teeth increase the kerf in a work-piece, either inward or outward. In various embodiments, one or both an enlarged tooth overhang and/or a set of the teeth increases the kerf of the hole saw relative to the sidewall thickness. This results in improved wear resistance, decreased heat on the teeth while cutting, and facilitates slug removal.

21 Claims, 3 Drawing Sheets

Related U.S. Application Data

(60) Provisional application No. 62/935,315, filed on Nov. 14, 2019.

(58) Field of Classification Search
CPC ........... Y10T 408/895; Y10T 408/8957; Y10T 408/8953; Y10T 408/896; B23D 61/021; B23D 61/121
USPC .................................. 408/204, 205, 206, 207
See application file for complete search history.

(56) References Cited

U.S. PATENT DOCUMENTS

| | | | |
|---|---|---|---|
| 3,973,455 A * | 8/1976 | Slaats ................... | B23D 61/021 |
| | | | 83/846 |
| 4,457,765 A * | 7/1984 | Wilson ................... | B23B 51/04 |
| | | | 51/293 |
| 4,693,644 A | 9/1987 | Takahashi | |
| 4,966,502 A | 10/1990 | Magyari | |
| 5,218,888 A | 6/1993 | Merrill | |
| 5,246,318 A | 9/1993 | Merrill | |
| 5,417,526 A * | 5/1995 | Stock ...................... | B23B 51/04 |
| | | | 408/703 |
| 5,569,002 A | 10/1996 | Kleine | |
| 5,794,503 A * | 8/1998 | Asada ...................... | B23C 5/08 |
| | | | 83/835 |
| 5,803,678 A | 9/1998 | Korb et al. | |
| 6,158,324 A * | 12/2000 | Kullmann ............ | B23D 61/021 |
| | | | 408/206 |
| 6,269,722 B1 * | 8/2001 | Hellbergh ............ | B23D 61/121 |
| | | | 83/847 |
| 6,588,992 B2 | 7/2003 | Rudolph | |
| 6,599,063 B1 | 7/2003 | Capstran | |
| 6,786,684 B1 | 9/2004 | Ecker | |
| 6,939,092 B2 | 9/2005 | Korb et al. | |
| 7,658,136 B2 * | 2/2010 | Rompel ............... | B23B 51/0426 |
| | | | 83/835 |
| 7,818,867 B1 * | 10/2010 | Capstran ............. | B23B 51/0453 |
| | | | 408/206 |
| 8,622,665 B2 | 1/2014 | Ibarra et al. | |
| 9,038,512 B2 * | 5/2015 | Horiguchi ............. | B23D 63/20 |
| | | | 83/13 |
| 9,731,365 B2 * | 8/2017 | Cranna ................ | B23D 61/121 |
| 10,279,408 B2 | 5/2019 | Rakurty et al. | |
| 10,384,273 B2 | 8/2019 | Rakurty | |
| 10,821,531 B2 * | 11/2020 | Yamashita ........... | B23D 61/127 |
| 2002/0106254 A1 * | 8/2002 | Rudolph ............. | B23B 51/0426 |
| | | | 408/206 |
| 2003/0010177 A1 * | 1/2003 | Cook ..................... | B23D 65/00 |
| | | | 83/835 |
| 2005/0025593 A1 | 2/2005 | Korb et al. | |
| 2005/0257660 A1 * | 11/2005 | Hayden ................ | B23D 61/121 |
| | | | 83/846 |
| 2008/0279646 A1 | 11/2008 | Miyanaga | |
| 2012/0000338 A1 * | 1/2012 | Elliston ................. | B23B 51/04 |
| | | | 83/697 |
| 2012/0093599 A1 | 4/2012 | Evatt et al. | |
| 2017/0120347 A1 | 5/2017 | Lourenco et al. | |
| 2017/0297124 A1 * | 10/2017 | Rakurty ................ | B23D 65/00 |
| 2018/0056404 A1 * | 3/2018 | Beach .................. | B23D 61/121 |
| 2018/0056405 A1 * | 3/2018 | Rakurty ................ | B28D 1/041 |
| 2018/0099341 A1 * | 4/2018 | Rakurty ................ | B23D 65/00 |
| 2018/0193926 A1 | 7/2018 | Sawa et al. | |
| 2019/0091775 A1 * | 3/2019 | Beach .................... | B23B 51/04 |
| 2019/0168314 A1 | 6/2019 | Lourenco et al. | |

FOREIGN PATENT DOCUMENTS

| | | | |
|---|---|---|---|
| EP | 0156762 | 5/1988 | |
| EP | 0583629 | 4/1998 | |
| EP | 1175870 | 1/2002 | |
| EP | 1319455 A1 * | 6/2003 | ......... B23B 51/0406 |
| EP | 1543907 | 6/2005 | |
| EP | 2987577 | 2/2016 | |
| JP | 5249517 | 7/2013 | |
| TW | I656929 | 4/2019 | |
| WO | WO 2004/020162 | 3/2004 | |
| WO | WO13026594 | 2/2013 | |

* cited by examiner

HOLE SAW WITH LARGE CARBIDE OVERHANG

CROSS-REFERENCE TO RELATED PATENT APPLICATION

The present application is a continuation of International Application No. PCT/US2020/060174, filed on Nov. 12, 2020, which claims the benefit of and priority to U.S. Provisional Patent Application No. 62/935,315 filed on Nov. 14, 2019, which are incorporated herein by reference in their entireties.

BACKGROUND OF THE INVENTION

The present invention generally relates to the field of tools. The present invention relates specifically to a hole saw having a plurality of cutting teeth. In general, a hole saw includes a cylindrical structure with cutting teeth at one end of the cylinder. In use, the hole saw spins at a high rate of speed, cutting a hole in a work-piece that has a size and shape that generally matches the size and shape of the cylindrical structure.

SUMMARY OF THE INVENTION

One embodiment of the invention relates to a hole saw, including a body, such as a cylindrical saw body, including cutting teeth at one end of a sidewall and an endcap at an opposite end. The cutting teeth make a cutting edge at a cutting end of the sidewall. At the opposite end of the saw body, the endcap secures the saw blade and couples the saw blade sidewall to a power tool or rotational device. At least some of the cutting teeth are made of carbide material. At least some carbide cutting teeth overhang an inner diameter of the cylindrical saw body's sidewall, such that the overhanging teeth extend radially inward from the sidewall. In some such embodiments, the overhanging teeth are wider in the radial direction than the width of the saw body, and this extra width provides the interior extending overhang.

A set refers to positioning the carbide teeth at an inward or outward angle of a saw tooth relative to the sidewall. The teeth extend inward or outward relative to the cylindrical sidewall. In some embodiments, the overhanging teeth are also set to the inside between 0.005" and 0.027" (e.g., 0.005 inches to 0.027 inches) to increase the cutting edge kerf and reduce wear on the teeth and/or blade. Thus, in such embodiments, the cutting edge of the hole saw increases the kerfs size by both including wide, overhanging teeth that are further set inward to further increase the extent of the inward overhang of at least some of the cutting teeth.

Another embodiment relates to a set for cutting teeth that includes some carbide teeth of the cutting edge set 0.027" to the inside, and some carbide teeth set 0.015" to the outside or less. For example, the cutting edge set is 0.22" to the inside and 0.015" to the outside. This configuration creates offset teeth oriented inward to reduce wear on the cutting edge of the remaining cutting teeth. This also creates a broader or wider kerf, resulting in a smaller plug that is easier to remove from the hole saw's inner diameter. For example, inner overhang teeth combined with outward set teeth create a kerf that extends radially from the defined inner kerf diameter to the defined outer kerf diameter of the overhang/set teeth. In this embodiment, the outer kerf diameter is greater than the outer sidewall diameter, and the inner kerf diameter is less than the inner sidewall diameter. Stated differently, the kerf is wider/broader than the thickness of the sidewall.

Another embodiment of the invention relates to a hole saw with an endcap coupled to the base of a sidewall. The sidewall extends axially from the base to a cutting end of the sidewall opposite the base. The sidewall has a thickness between an inner sidewall diameter and an outer sidewall diameter. The sidewall includes cutting teeth arranged on the sidewall at the cutting end and overhang teeth that are wider than the cutting teeth. The overhang teeth extend radially inward from the sidewall to form an inner kerf diameter that is less than the inner sidewall diameter.

Another embodiment of the invention relates to a hole saw with an endcap coupled to a base of the sidewall to form a cylindrical body. The sidewall extends axially from the base to a cutting end of the sidewall opposite the base and defines a thickness between an inner sidewall diameter and an outer sidewall diameter. The sidewall has cutting teeth arranged on the sidewall and carbide teeth at the cutting end. The carbide teeth define a kerf with an inner kerf diameter. The carbide teeth have an inner overhang, and an inner set. The inner overhang of the carbide teeth extends radially inward over the inner sidewall diameter. The inner set of the carbide teeth defines an inward angle relative to the inner sidewall diameter. The inner overhang and the inner set form the inner kerf diameter that is less than the inner sidewall diameter.

Another embodiment of the invention relates to a hole saw with an endcap coupled to a base of a sidewall to form a cylindrical body. The sidewall extends axially from the base to a cutting end opposite the base and defines a thickness between an inner sidewall diameter and an outer sidewall diameter. The sidewall has cutting teeth with no set arranged on the cutting end of the sidewall. An inner set tooth is located on the sidewall and defines an inner set with an inward angle relative to the inner sidewall diameter. The inner set tooth extends radially inward at the inward angle from the inner sidewall diameter, such that an inner kerf diameter that is less than the inner sidewall diameter. An outward set tooth located on the cutting end of the sidewall defines an outward set with an outward angle relative to the outer sidewall diameter. The outward set tooth extends radially outward from the outer sidewall diameter at the outward angle, such that an outer kerf diameter is greater than the outer sidewall diameter.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
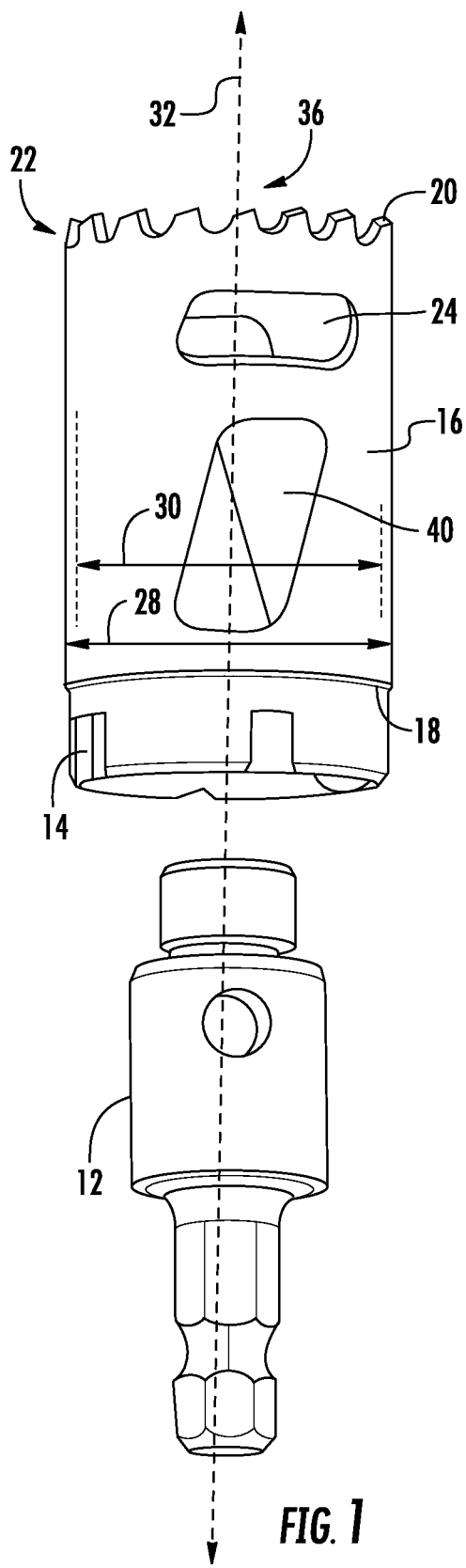
FIG. 1 is a perspective view of a hole saw and an arbor, according to one embodiment.

Referring generally to the figures, various embodiments of a hole saw are shown. As discussed in more detail herein, Applicant has developed a variety of hole saw designs utilizing wide/overhang teeth and/or angled set teeth to improve cutting performance. In general, a hole saw includes an endcap coupled to a sidewall with cutting teeth at an end opposite the endcap. The sidewall is generally cylindrical. To form the cylindrical sidewall, a flat sidewall with a cutting end and a base opposite the cutting end is rolled around the endcap to form a cylindrical sidewall coupled/secured to the endcap. The endcap supports the cylindrical sidewall and includes a mounting structure that releasably couples the hole saw to a powered driving device (e.g., a power tool). For example, the power tool rotates an arbor connected to the endcap to drive the hole saw in rotation and cut a hole in a work-piece with the cutting teeth. The endcap provides support and rigidity to the sidewall, and the sidewall supports the cutting teeth.

As discussed herein, the orientation of the cutting teeth determines the size of a slot or kerf that the rotating teeth create in the work-piece. In some embodiments, the kerf is greater than the thickness of the sidewall of the hole saw. For example, the teeth are oriented such that an inner diameter of the kerf cut by inside teeth of the sidewall is smaller than the inner diameter of the sidewall or endcap supporting the sidewall. The largest diameter of a slug formed between the inside set of teeth is less than the smallest diameter of the sidewall proximal to the endcap (e.g., not at the cutting teeth). This sizing allows an operator to remove the slug more easily following cutting since the outer diameter of the slug is less than the inner sidewall diameter.

Kerf size is affected by two design parameters. First, the inward orientation of a large or oversized blade on the tooth. For example, a large carbide blade creates an inner overhang extending inward from the sidewall. Second, the saw tooth offset, position, angle, or set affects the kerf. Set on a saw tooth refers to the position or angle of the carbide material on the teeth. For example, the set refers to angled teeth oriented inwards and/or outwards from the sidewall diameter. The set creates a tooth offset around the sidewall's circumference that increases the kerf around the sidewall. In other words, both the overhang of a large blade on a tooth and the set (e.g., angled offset) of a tooth creates an enlarged kerf. The resulting enlarged kerf is greater than the thickness of the sidewall. Utilizing a hole saw including wide overhang teeth and/or the set design/patterns discussed herein provides for selected kerf size. In addition, the hole saws discussed herein utilizing wide overhang teeth, angled set patterns, and/or carbide materials provide improved cutting and saw performance, for example, by helping prevent heat buildup on the cutting teeth and thus increases cutting teeth longevity by decreasing the wear during cutting operations.

Figure 2:
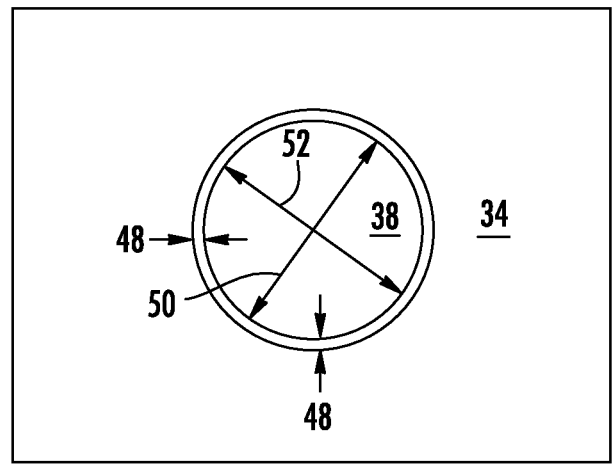
FIG. 2 is a cut work-piece with a kerf cut and a slug, according to an exemplary embodiment.

FIG. 1 shows a hole saw 10 and an arbor 12. Hole saw 10 has an endcap 14 and a sidewall 16 with a base 18 on one end and cutting teeth 20 on an opposite cutting end 22. As described below, cutting teeth 20 include teeth with and/or without an overhang, offset, and/or set. When rolled into a cylindrical shape, sidewall 16 extends axially from base 18 to a cutting end with cutting teeth 20. Sidewall 16 has a thickness equal to the distance between an inside surface 24 and an outside surface 26. The thickness of sidewall 16 is defined as one-half the difference between an outer sidewall diameter 28 and an inner sidewall diameter 30. Endcap 14 couples to base 18 of sidewall 16 to form a cylindrical hole saw 10 (e.g., sidewall 16 is wrapped or rolled around a circumference of endcap 14). Arbor 12 releasably couples to endcap 14 to rotate cutting teeth 20 on sidewall 16 about a longitudinal axis 32 and cut a circular hole through a work-piece 34 (FIG. 2). A central elongated cavity 36 is formed inside the cylindrical sidewall 16 within inner surface 24 (e.g., inner sidewall diameter 30).

In some embodiments, openings 40 are located in sidewall 16 to reduce weight and/or provide access to a slug 38 (FIG. 2) or other debris formed while operating hole saw 10. For example, an operator places a screwdriver, or another available tool/device, through an opening 40 of sidewall 16 to pry a slug 38 out of cavity 36. Cutting teeth 20 have a set (e.g., are offset or have a set tooth 42) and/or include a blade 44 with overhang teeth 46 that cut work-piece 34 to form a kerf 48. Kerf 48 is a thickness of the cut produced by the cutting teeth 20 of hole saw 10 and is defined as one half the difference between outer teeth or kerf diameter 50 and inner teeth or kerf diameter 52 (FIG. 2). The cutting edge creates kerf 48 that extends radially from inner kerf diameter 52 to outer kerf diameter 50, such that kerf 48 is greater or larger than a radial width or thickness of sidewall 16. In some embodiments, kerf 48 is larger than sidewall 16 thickness to form a larger hole in work-piece 34 and/or reduce slug 38 size, such as facilitating removal of slug 38 from cavity 36. In other words, an outer slug diameter 38 is less than the inner sidewall diameter 30.

Figure 6:
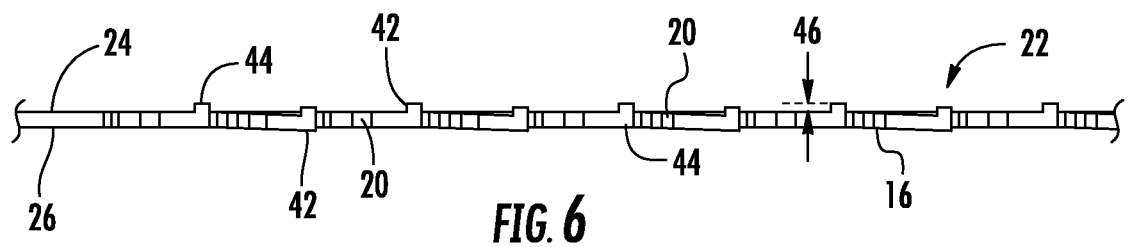
FIG. 6 is a detailed view of a hole saw with carbide teeth having both a set angle and offset, according to an exemplary embodiment.
Figure 10:
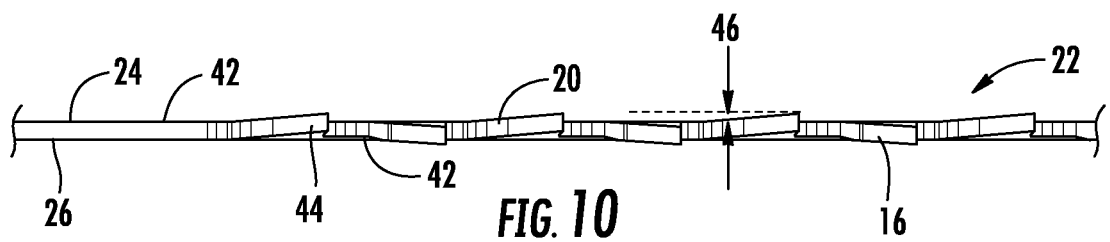
FIG. 10 is a detailed view of a carbide tooth set and offset similar to the plan views of FIGS. 8 and 9, according to an exemplary embodiment.
Figure 11:
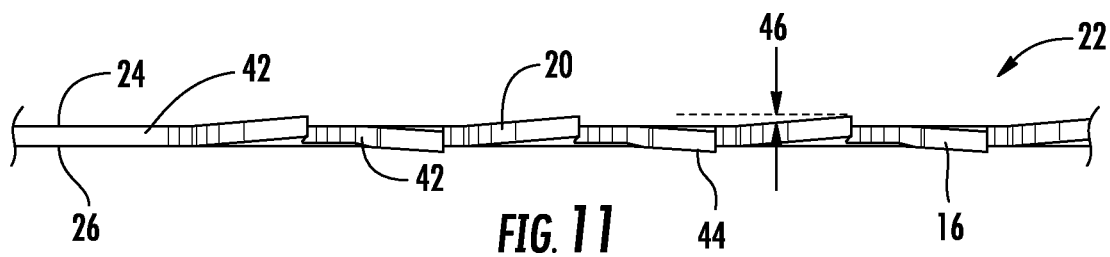
FIG. 11 is a detailed view of a carbide tooth set and offset similar to the plan views of FIGS. 8 and 9, according to an exemplary embodiment.

FIG. 2 shows work-piece 34 with a partial or complete cut forming kerf 48 and slug 38. As will be understood from the description below, kerf 48 results from the rotation of hole saw 10 cutting teeth 20 supporting blade 44 and is one-half the difference between an outer kerf diameter 50 that includes the set tooth 42 and/or blade 44 overhang teeth 46 (FIGS. 6, 10, and 11). Set tooth 42 and/or blade 44 overhang teeth 46 reduce friction, heat, and/or wear on cutting teeth 20 (e.g., carbide and/or cutting teeth) and enhance the longevity of the hole saw 10.

An overhang tooth ("overhang teeth 46") is wider in a radial direction of sidewall 16 than a width of the sidewall 16 or cutting teeth 20. The wider overhang teeth 46, e.g., on a plurality of cutting teeth 20, defines the inner kerf diameter 52. Similarly, set tooth 42 defines an inward (or outward) angle of the cutting teeth 20 and/or overhang teeth 46 relative to inner sidewall diameter 30. For example, cutting teeth 20 form the inward angle (e.g., inner set tooth 42), and overhang teeth 46 extends radially inward from inner surface 24 of sidewall 16 to form an inner kerf diameter 52 that is less than inner sidewall diameter 30.

In one embodiment, sidewall 16 has a first overhang tooth 46 that extends over inner sidewall diameter 30 (e.g., inwards) and a second overhang teeth 46 over outer sidewall diameter 28 (e.g., outwards). Overhang teeth 46 are wider than a width or thickness of sidewall 16.

In this way, the kerf 48 thickness is greater than the sidewall 16 thickness. Set tooth 42 and/or blade 44 overhang teeth 46 reduces friction, heat, and/or wear on cutting teeth 20 and facilitates removal of slug 38, which has a resulting outer diameter (e.g., approximately equal to inner kerf diameter 52) that is smaller than inner sidewall diameter 30.

Figure 3:
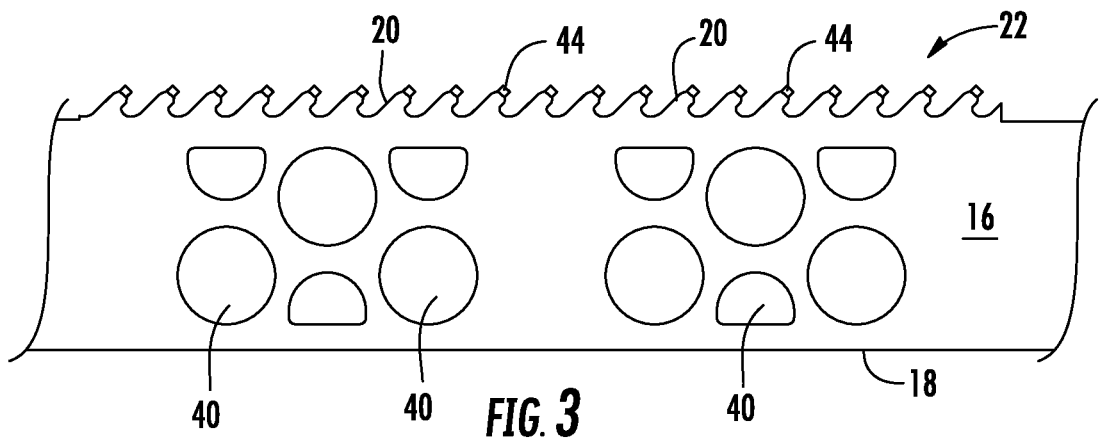
FIG. 3 is a side plan view of the sidewall of a hole saw, according to an exemplary embodiment.
Figure 4:
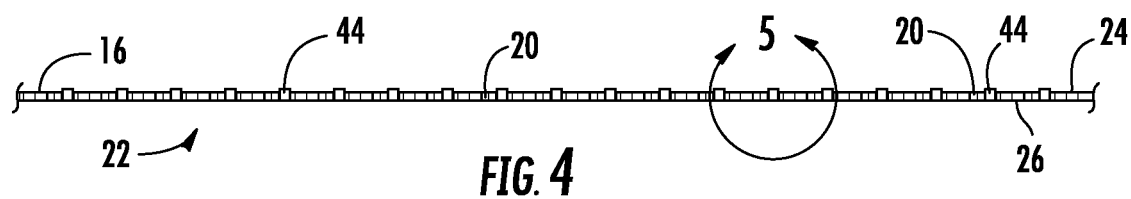
FIG. 4 is a plan view of the teeth on the cutting end of the sidewall of FIG. 3, according to an exemplary embodiment.

FIG. 3 shows the "flat" or unrolled sidewall 16 of hole saw 10. Sidewall 16 includes openings 40 and cutting teeth 20 oriented and/or set teeth 42 in a repeating pattern. In some embodiments, cutting teeth 20 include blade 44 and/or carbide material. Blade 44 is a hardened end of tooth 20 configured to interface and cut work-piece 34, e.g., a carbide-tipped blades 44. Blade 44 includes an overhang tooth 46 inwards/outwards from outer/inner sidewall diameters 28 and/or 30. A hardened carbide steel or diamond material forms blade 44, overhang teeth 46, and/or cutting teeth 20. FIG. 4 shows cutting teeth 20 on cutting end 22 of sidewall 16 in FIG. 3. FIGS. 3 and 4 show a repeating pattern of cutting teeth 20 and carbide tips or blades 44. The repeating pattern is the same, or similar, in FIG. 3 as FIG. 4. Blades 44 repeat in a similar pattern, e.g., with similar cutting teeth 20 spacing of set teeth 42 and/or blade 44 overhang teeth 46.

Figure 5:
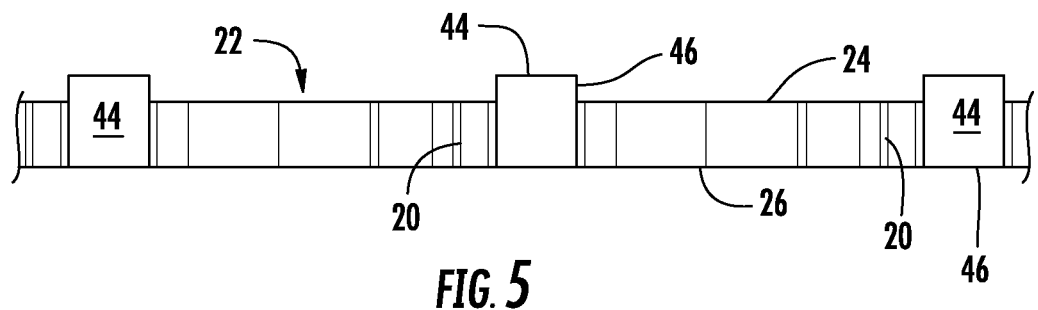
FIG. 5 is a detailed view of the carbide tooth offsets of FIG. 4, according to an exemplary embodiment.

FIG. 5 is a detailed view of FIGS. 3 and/or 4 showing one embodiment of cutting teeth 20 with blade 44 overhang teeth 46. In some embodiments, overhang teeth 46 comprises a carbide material. The configuration of FIG. 5 only includes overhang teeth 46 (e.g., there is no set tooth 42 in cutting teeth 20 over inner sidewall diameter 30). Using this configuration, each blade 44 of each cutting tooth 20 is overhang teeth 46 on inside surface 24 and flush on outside surface 26 of sidewall 16. This configuration creates a kerf 48 that is thicker than sidewall 16 thickness (e.g., the distance between inside and outside surfaces 24 and 26). Overhang teeth 46 tooth 20 has a radially outer surface that is flush (e.g., +/−0.001" flush) with outside surface 26. Overhang teeth 46 extends radially inward from inside surface 24. All dimensions herein have tolerance of ±0.001", unless specifically indicated otherwise. In various embodiments, overhang teeth 46 extends between 0.010" and 0.040", specifically between 0.015" and 0.030", and more specifically between 0.020" and 0.025" (±0.001"). In one embodiment, overhang teeth 46 is 0.020" (±0.001") on inside surface 24 and 0.001" (±0.001") on outside surface 26. In other words, wide overhang teeth 46 extend inward (e.g., radially inwards) and define inner kerf diameter 52, which is less than inner sidewall diameter 30.

In some embodiments, overhang teeth 46 has a pattern. For example, every other tooth 20 has an overhang teeth 46. In various embodiments, every third or fourth tooth 20 has an overhang teeth 46. In some embodiments, a first overhang teeth 46 extends radially inwards (inward), and a second overhang teeth 46 extends radially outward (outward). Similarly, every other tooth 20 is a set tooth 42 (e.g., every third or fourth tooth 20 is a set tooth 42). In some embodiments, the first set tooth 42 extends radially inward, and a second set tooth 42 extends radially inwards. In other embodiments, less than or equal to 50% of cutting teeth 20 include overhang teeth 46. In various embodiments, less than or equal to 35%, 25%, 20%, 17%, 15%, or 12.5% of cutting teeth 20 on hole saw 10 include set teeth 42 and/or overhang teeth 46.

For example, a tooth 20 extending radially inwards (e.g., overhang teeth 46 and/or set teeth 42) and a tooth 20 extending radially outwards (e.g., overhang teeth 46 and/or set teeth 42) are separated by one, two, three, four, five, six, seven, eight, nine, ten, or more cutting teeth 20 without an offset from either an overhang teeth 46 and/or set teeth 42. For example, two or more cutting teeth separate set teeth 42 and/or overhang teeth 46. In one embodiment, each set tooth 42 and/or overhang tooth 46 is separated by three or more carbide cutting teeth, e.g., without a set tooth 42 or overhang tooth 46.

Stated differently, cutting teeth 20 on sidewall 16 repeat in a pattern for an inner set tooth 42, some cutting teeth 20 without a set, offset, or overhang, and an outward set tooth 42. Specifically, both sides of a tooth 20 with an inner set (e.g., inner set tooth 42) are adjacent to cutting teeth 20 (e.g., on either side) without a set tooth 42 or an overhang teeth 46. Similarly, both sides of a tooth 20 with an outward set (e.g., outward set tooth 42) are adjacent to cutting teeth 20 (e.g., on either side) without a set, offset, or overhang.

Similarly, FIG. 6 shows a series of cutting teeth 20 that include both set teeth 42 and overhang teeth 46 to further increase kerf 48. In other words, overhang teeth 46 teeth are offset in the radial direction and are wider in a radial direction than cutting teeth 20. This configuration is similar to FIGS. 4 and 5 but includes both set teeth 42 (e.g., blade 44 offsets) and overhang teeth 46 to increase the resulting kerf 48 thickness. In one configuration, set tooth 42 is 0.022" (±0.001") towards inside surface 24 and 0.015" (±0.001") towards outside surface 26 with overhang teeth 46 of 0.005" (±0.001") on inside surface 24. In various embodiments, set tooth 42 is between 0.001" and 0.010" (±0.001") on inside surface 24 and 0.001" (±0.001") on outside surface 26 with outward overhang teeth 46 between 0.001" and 0.010", specifically set tooth 42 is between 0.002" and 0.007" (±0.001") on inside surface 24 and 0.001" (±0.001") on outside surface 26 with blade 44 overhang teeth 46 between 0.002" and 0.007".

Figure 7:
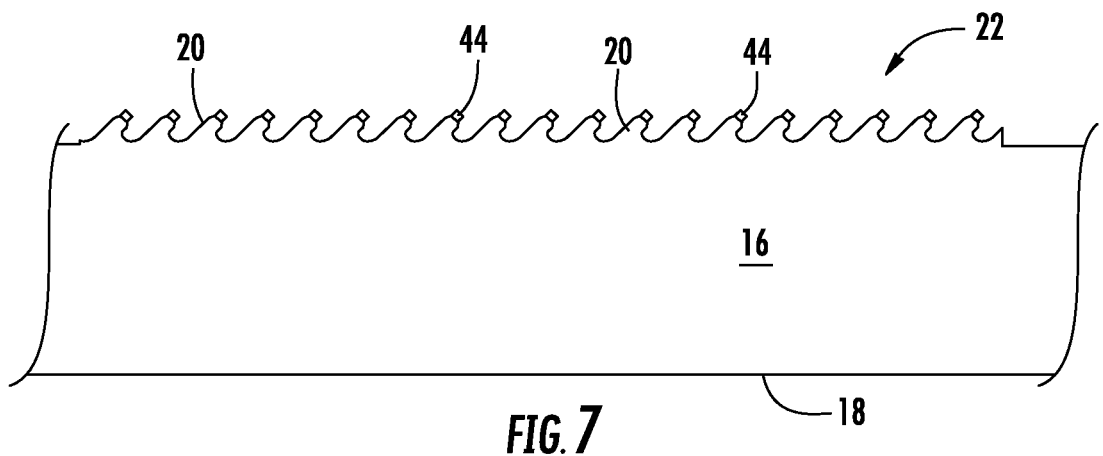
FIG. 7 is a side plan view of the sidewall of another hole saw, according to an exemplary embodiment.
Figure 8:
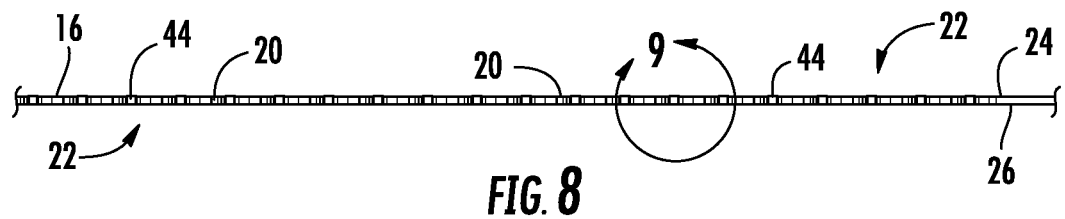
FIG. 8 is a plan view of the teeth on the cutting end of the sidewall of FIG. 7, according to an exemplary embodiment.
Figure 9:
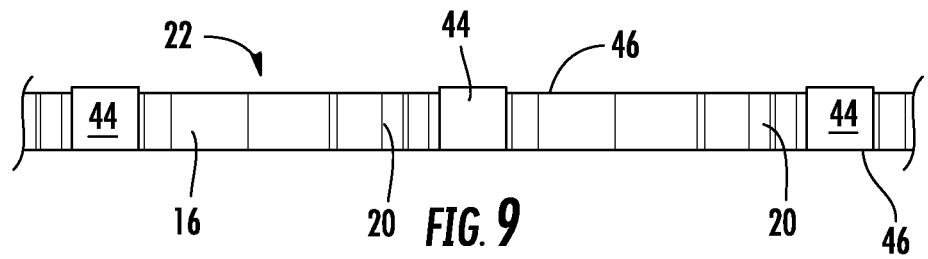
FIG. 9 is a detailed view of the carbide tooth offsets of FIG. 8, according to an exemplary embodiment.

FIG. 7 shows sidewall 16 cutting teeth 20 of one embodiment of hole saw 10, e.g., without openings 40. In various embodiments, FIG. 7 includes different sized openings 40, for example, the same as or similar to openings 40 of FIG. 3, with various shapes (e.g., square, hexagonal, circular, oval, elliptical, etc.). FIGS. 8 and 9 show cutting teeth 20 on cutting end 22 of sidewall 16 of FIG. 7. Specifically, FIG. 9 is a detailed view of the set teeth 42 of cutting teeth 20 and the overhang teeth 46 of blade 44. With reference to FIGS. 7-9, cutting teeth 20 have no set teeth 42 (e.g., 0.000"±0.001") and blades 44 have an inner overhang teeth 46 of 0.005" with a tolerance of +0.002" and −0.001" towards inside surface 24 and an outer overhang teeth 46 of 0.001" (±0.001") towards outside surface 26.

FIG. 10 shows a carbide set tooth 42 and blade 44 overhang teeth 46, similar to the embodiment shown in FIGS. 8 and 9. The embodiment of FIG. 10 includes both set tooth 42 and blade 44 overhang teeth 46, which results in a hole saw 10 that produces increased kerf 48 thickness. In one configuration, set tooth 42 is 0.022" (±0.001") towards inside surface 24 and 0.015" (±0.001") towards outside surface 26 with overhang teeth 46 of 0.005"±0.001" on inside surface 24. In various embodiments, set tooth 42 is between 0.001" and 0.010" (±0.001") on inside surface 24 and 0.001" (±0.001") on outside surface 26 with blade 44 overhang teeth 46 between 0.001" and 0.010", specifically set tooth 42 is between 0.002" and 0.007" (±0.001") on inside surface 24 and 0.001" (±0.001") on outside surface 26 with overhang teeth 46 between 0.002" and 0.007" or overhang teeth 46 between 0.015" and 0.025" (±0.001").

With reference to a specific inner set tooth 42, FIGS. 2 and 9-10 show an inner set tooth 42 that defines an inward angle (e.g., inner set 42) on tooth 20 relative to inner surface 24 or inner sidewall diameter 30. In other words, an inner set tooth 42 extends radially inward (e.g., inward) from the inner sidewall diameter 30 and inner surface 24 of sidewall 16. This orientation creates an inner kerf diameter 52 that is less (e.g., smaller) than inner surface 24. Because of this, the inner kerf diameter 52 is less than the inner sidewall diameter 30. For example, inner set tooth 42 extends at an inward radial angle (e.g., radially inward) from sidewall 16. Accordingly, an inner set tooth 42 creates an inner kerf diameter 52 that is less than or smaller than inner sidewall diameter 30.

Similarly, an outward set tooth 42 defines an outward angle (e.g., an outward set 42) relative to the outer surface 26 of sidewall 16. Due to outward set tooth 42 (e.g., the outer angle), tooth 20 extends radially outward (e.g., outward) from the outer surface 26. In this way, an outward set tooth 42 creates an outer kerf diameter 50 greater than outer sidewall diameter 28. Accordingly, an inner or outward set tooth 42 creates a kerf 48 greater than the sidewall thickness (e.g., half the difference between outer sidewall diameter 28 minus inner sidewall diameter 30).

FIG. 11 shows a set/offset on a carbide tooth 20 with a blade 44 and overhang teeth 46, similar to the embodiments shown in FIGS. 7-10. In some embodiments, set tooth 42 is 0.027" (±0.001") towards inside surface 24 and 0.015" (±0.001") towards outside surface 26 with overhang teeth 46 of 0.005"±0.001" on inside surface 24. In various embodiments, set tooth 42 is between 0.025" and 0.030" (±0.001") on inside surface 24 and between 0.012" and 0.018 (±0.001") on outside surface 26 with overhang teeth 46 between 0.001" and 0.020", specifically set tooth 42 is between 0.025" and 0.030" (±0.001") on inside surface 24 and between 0.012" and 0.018" (±0.001") on outside surface 26 with blade 44 overhang teeth 46 between 0.003" and 0.007" or overhang teeth 46 of 0.018" and 0.022" (±0.001").

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements. The position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions, and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

In various exemplary embodiments, the relative dimensions, including angles, lengths, and radii, as shown in the figures, are to scale. Actual measurements of the Figures will disclose relative dimensions, angles, and proportions of the various exemplary embodiments. Various exemplary embodiments extend to various ranges around the absolute and relative dimensions, angles, and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A hole saw, comprising:
    a sidewall extending axially from a base to a cutting end of the sidewall opposite the base, the sidewall having a thickness extending between an inner sidewall diameter and an outer sidewall diameter;
    first cutting teeth arranged on the sidewall at the cutting end, the first cutting teeth having a width that is the same as the thickness of the sidewall; and
    overhang cutting teeth that are wider than the first cutting teeth, wherein the overhang cutting teeth extend radially inward from the sidewall to form an inner kerf diameter that is less than the inner sidewall diameter, and wherein the overhang cutting teeth have radially outer surfaces, and wherein an entire length of the radially outer surface of each of the overhang cutting teeth is flush with an outer surface of the sidewall; and
    an endcap coupled to the base of the sidewall.

2. The hole saw of claim 1, wherein the overhang cutting teeth comprise a carbide material.

3. The hole saw of claim 1, further comprising an outer overhang cutting tooth that is wider than the thickness of the sidewall, and wherein the outer overhang cutting tooth extends outward and defines an outer kerf diameter.

4. The hole saw of claim 1, wherein the overhang cutting teeth are angled inward relative to the sidewall defining a set, wherein the set is between 0.005 inches and 0.020 inches.

5. The hole saw of claim 1, further comprising outward set cutting teeth, wherein the overhang cutting teeth and the outward set cutting teeth create a kerf that extends radially from the inner kerf diameter to an outer kerf diameter, wherein the outer kerf diameter is greater than the outer sidewall diameter, and wherein the kerf is wider than the thickness of the sidewall.

6. The hole saw of claim 5, wherein the outward set cutting teeth extend 0.015 inches or less from the outer sidewall diameter.

7. The hole saw of claim 1, wherein each overhang cutting tooth is adjacent to a first cutting tooth.

8. The hole saw of claim 1, wherein the overhang cutting teeth have carbide-tipped blades that extend radially inwards 0.027 inches or less from the inner sidewall diameter.

9. The hole saw of claim 1, further comprising openings located in the sidewall.

10. The hole saw of claim 1, wherein the overhang cutting teeth have no set relative to the inner sidewall diameter and have an inner overhang of between 0.005 inches and 0.027 inches.

11. The hole saw of claim 1, wherein the length of the radially outer surface of each of the overhang cutting teeth is flush with a length of the outer surface of the sidewall.

12. A hole saw, comprising:
a cylindrical body, comprising:
  a sidewall extending axially from a base to a cutting end of the sidewall opposite the base, the sidewall defining a thickness extending between an inner sidewall diameter and an outer sidewall diameter;
  first cutting teeth arranged on the sidewall at the cutting end, the first cutting teeth having a width that matches the thickness of the sidewall; and
  carbide cutting teeth at the cutting end, the carbide cutting teeth wider than the first cutting teeth and defining a kerf with an inner kerf diameter, wherein an entire radially outer surface of each of the carbide cutting teeth is flush with an outer surface of the sidewall, the carbide cutting teeth comprising:
    inner overhang cutting teeth, wherein the inner overhang cutting teeth of the carbide cutting teeth extend radially inward over the inner sidewall diameter; and
    inner set cutting teeth of the carbide cutting teeth defining an inward angle relative to the inner sidewall diameter, wherein the inner overhang cutting teeth and the inner set cutting teeth form the inner kerf diameter that is less than the inner sidewall diameter; and
an endcap coupled to the base of the sidewall.

13. The hole saw of claim 12, wherein less than or equal to 35% of the teeth on the sidewall are either the inner overhang cutting teeth or the inner set cutting teeth.

14. The hole saw of claim 12, wherein the kerf is equal to a width of the inner overhang cutting teeth, and wherein the kerf is greater than the thickness of the sidewall.

15. The hole saw of claim 12, further comprising cutting teeth with a blade with an outward overhang, wherein the outward overhang is between 0.001 inches and 0.011 inches.

16. The hole saw of claim 12, further comprising carbide cutting teeth with an outward set, wherein the outward set has an outer overhang with a width that is greater than the thickness of the sidewall, and wherein the inner set cutting teeth of the carbide cutting teeth is between 0.005 inches and 0.020 inches.

17. The hole saw of claim 12, the first cutting teeth and the carbide cutting teeth further comprising a pattern, the pattern comprising a first carbide tooth, carbide cutting teeth, and a second carbide tooth, wherein the first carbide tooth has an inner overhang and an inner set, and wherein the second carbide tooth has an outer overhang and an outward set, and wherein three or more carbide cutting teeth are in the pattern between the first carbide tooth and the second carbide tooth.

18. A hole saw, comprising:
a cylindrical body, comprising:
  a sidewall extending axially from a base to a cutting end opposite the base, the sidewall defining a thickness extending between an inner sidewall diameter and an outer sidewall diameter;
  first cutting teeth with no set relative to the inner sidewall diameter arranged on the cutting end of the sidewall, the first cutting teeth having a width that is the same as the thickness of the sidewall;
  an inner set cutting tooth that defines an inner set with an inward angle relative to the inner sidewall diameter, wherein the inner set cutting tooth extends radially inward at the inward angle from the inner sidewall diameter, such that an inner kerf diameter that is less than the inner sidewall diameter; and
  an outward set cutting tooth that defines an outward set with an outward angle relative to the outer sidewall diameter, wherein the outward set cutting tooth extends radially outward from the outer sidewall diameter at the outward angle, such that an outer kerf diameter is greater than the outer sidewall diameter;
  an overhang cutting tooth wider than the first cutting teeth and wider than the thickness of the sidewall, the overhang cutting tooth having a radially outer surface, wherein the whole radially outer surface is flush with an outer surface of the sidewall; and
an endcap coupled to the base of the sidewall.

19. The hole saw of claim 18, further comprising an opening in the sidewall, and wherein two or more first cutting teeth separate the inner set cutting tooth and the outward set cutting tooth.

20. The hole saw of claim 18, wherein the overhang cutting tooth is between 0.001 inches and 0.005 inches wider than the thickness of the sidewall.

21. The hole saw of claim 18, wherein both sides of the inner set cutting tooth and the outward set cutting tooth are adjacent to the first cutting teeth, without the set or overhang.

* * * * *